United States Patent
Gwon

(10) Patent No.: US 11,386,196 B1
(45) Date of Patent: Jul. 12, 2022

(54) CONTENT WALLET DEVICE AND SELF-SOVEREIGN IDENTITY AND COPYRIGHT AUTHENTICATION SYSTEM USING THE SAME

(71) Applicant: Oh Gyoung Gwon, Seoul (KR)

(72) Inventor: Oh Gyoung Gwon, Seoul (KR)

( * ) Notice: Subject to any disclaimer, the term of this patent is extended or adjusted under 35 U.S.C. 154(b) by 0 days.

(21) Appl. No.: 17/617,418

(22) PCT Filed: Nov. 19, 2020

(86) PCT No.: PCT/KR2020/016341
§ 371 (c)(1),
(2) Date: Dec. 8, 2021

(87) PCT Pub. No.: WO2021/125586
PCT Pub. Date: Jun. 24, 2021

(30) Foreign Application Priority Data

Dec. 18, 2019 (KR) .................. 10-2019-0169407

(51) Int. Cl.
*G06F 21/46* (2013.01)
*H04L 9/32* (2006.01)
*H04L 9/40* (2022.01)

(52) U.S. Cl.
CPC ............ *G06F 21/46* (2013.01); *H04L 9/3226* (2013.01); *H04L 63/083* (2013.01)

(58) Field of Classification Search
CPC ...... G06F 21/46; H04L 9/3226; H04L 63/083
See application file for complete search history.

(56) References Cited

U.S. PATENT DOCUMENTS

| 10,027,678 | B1* | 7/2018 | Brandwine | G06F 11/3006 |
| 2006/0206643 | A1* | 9/2006 | Tran | G06F 13/00 710/100 |
| 2007/0271189 | A1* | 11/2007 | Morten | H04N 21/6543 348/E7.056 |
| 2009/0067079 | A1* | 3/2009 | Al-Azzawi | G06F 21/74 |
| 2012/0099219 | A1* | 4/2012 | Al-Azzawi | G06F 21/80 |
| 2015/0039517 | A1 | 2/2015 | Liberty et al. | |

(Continued)

FOREIGN PATENT DOCUMENTS

| CN | 107301544 A | 10/2017 |
| CN | 108960824 A | 12/2018 |

(Continued)

OTHER PUBLICATIONS

Office Action for KR 10-2019-0169407 dated Mar. 18, 2021.

(Continued)

*Primary Examiner* — James R Turchen
(74) *Attorney, Agent, or Firm* — Sughrue Mion, PLLC

(57) ABSTRACT

Disclosed is a content wallet device to which a storage device storing a content is connected including a communication unit for communication between the content wallet device and a user terminal device; an encryption unit generating encryption data including a user ID and a password for authentication between the content wallet device and the user terminal device; a switch unit controlling an electrical connection between the storage device and the communication unit; and a reset unit initializing the generated password when the electrical connection between the storage device and the communication unit is released by the switch unit.

7 Claims, 8 Drawing Sheets

(56) References Cited

U.S. PATENT DOCUMENTS

2017/0161709 A1    6/2017  Tunnell et al.
2020/0065502 A1*   2/2020  Lockman .............. G06F 9/4806
2021/0083872 A1*   3/2021  Desmarais ............ H04L 9/3239

FOREIGN PATENT DOCUMENTS

| KR | 10-2005-0091744 A | 9/2005 |
| KR | 10-0669224 B1 | 1/2007 |
| KR | 10-2010-0135519 A | 12/2010 |
| KR | 10-2019-0128868 A | 11/2019 |

OTHER PUBLICATIONS

Notice of Allowance for KR 10-2019-0169407 dated Aug. 4, 2021.
International Search Report of PCT/KR2020/016341 dated Mar. 30, 2021 [PCT/ISA/210].

* cited by examiner

【FIG. 1】
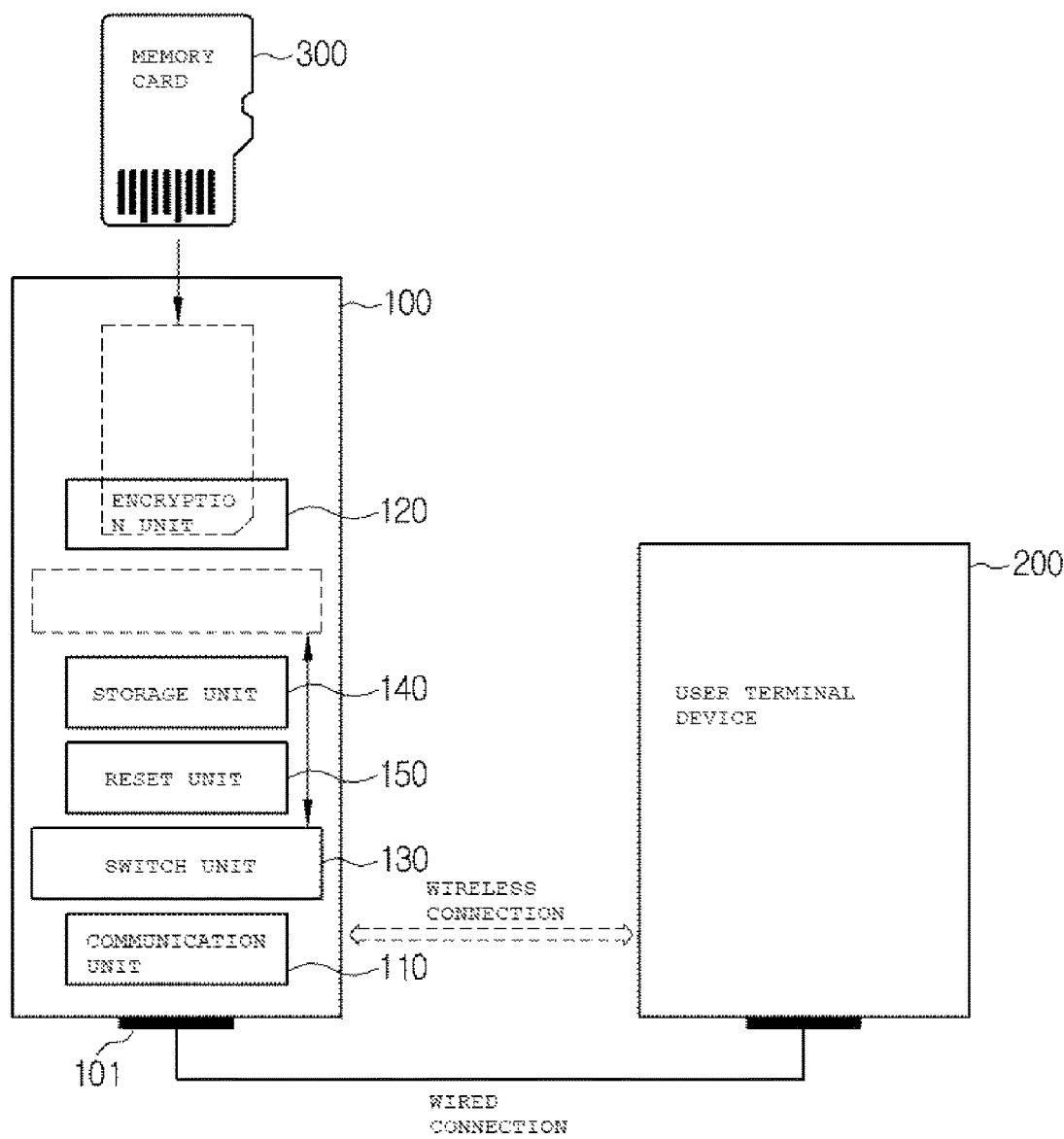

[FIG. 2]
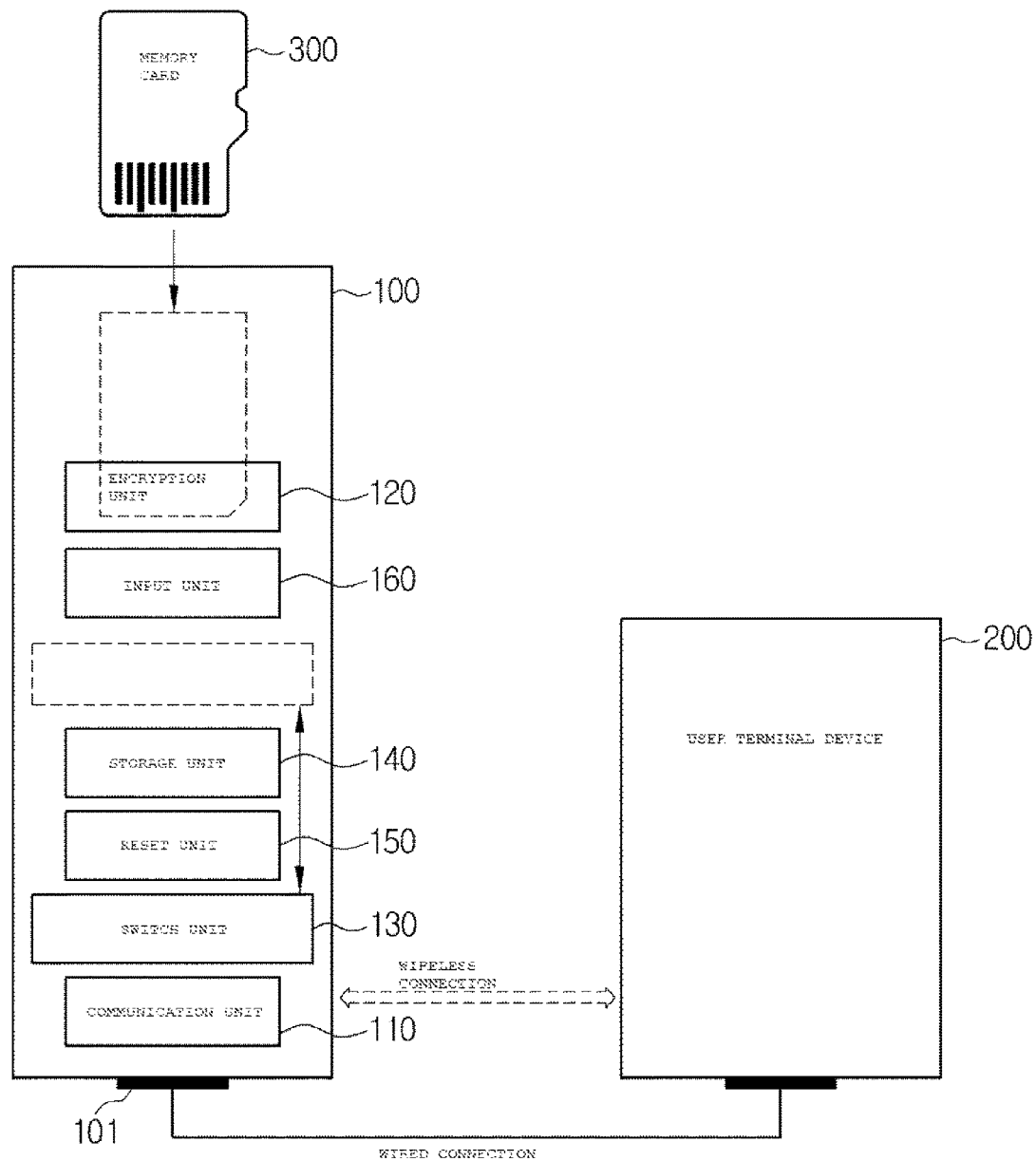

[FIG. 3]
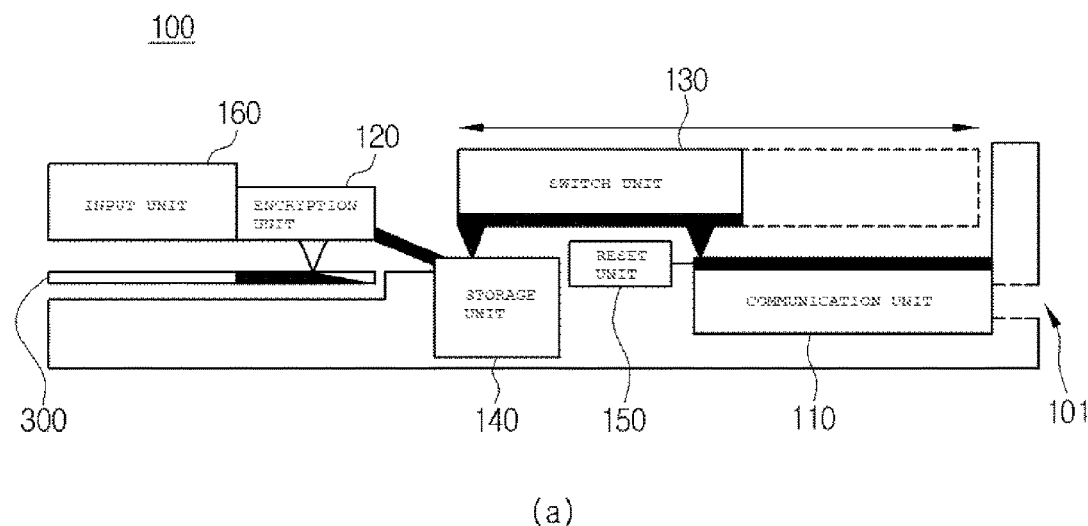
(a)
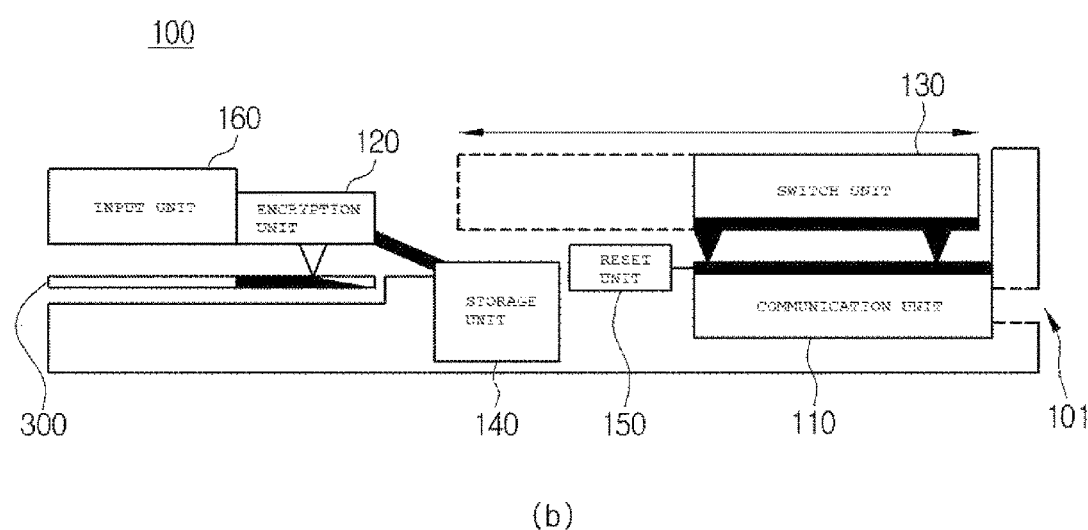
(b)

[FIG. 4]
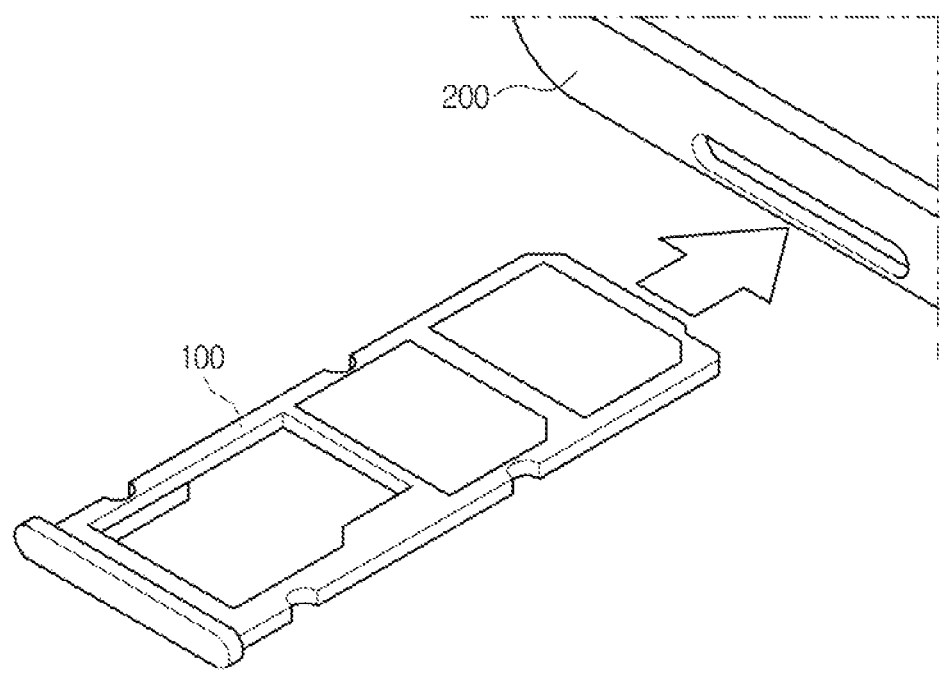

【FIG. 5】
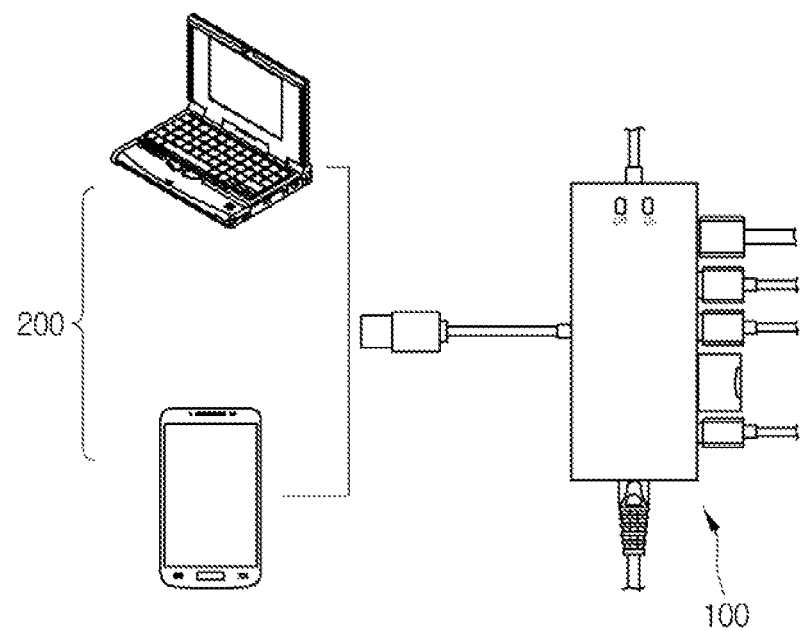

[FIG. 6]
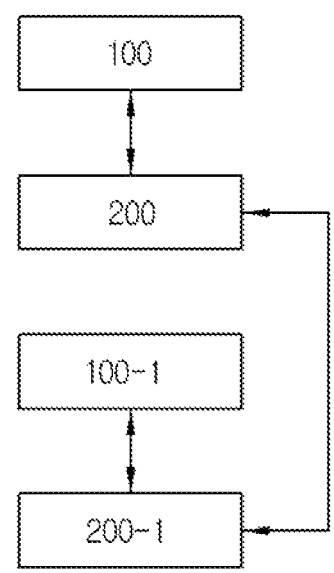

[FIG. 7]
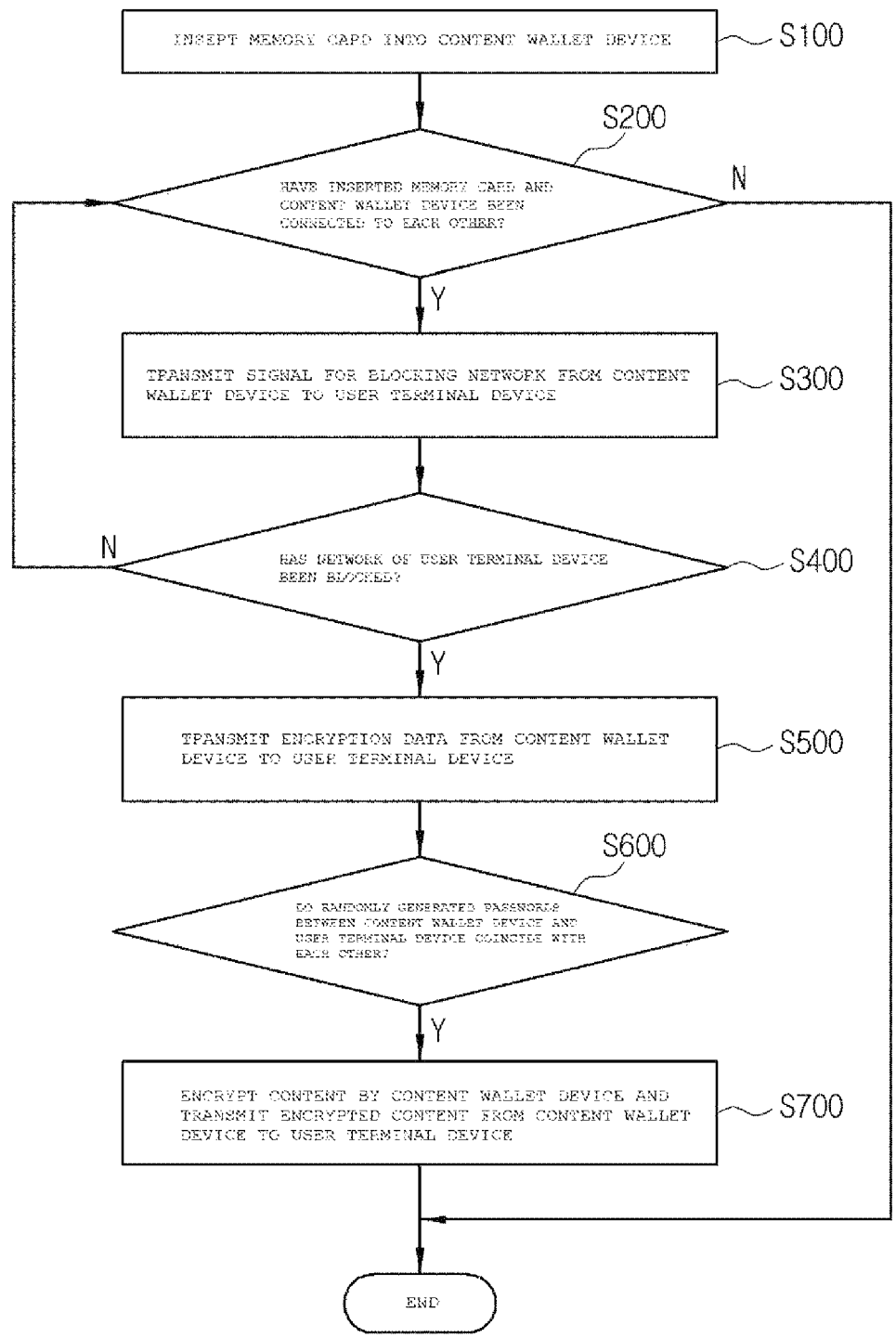

[FIG. 8]
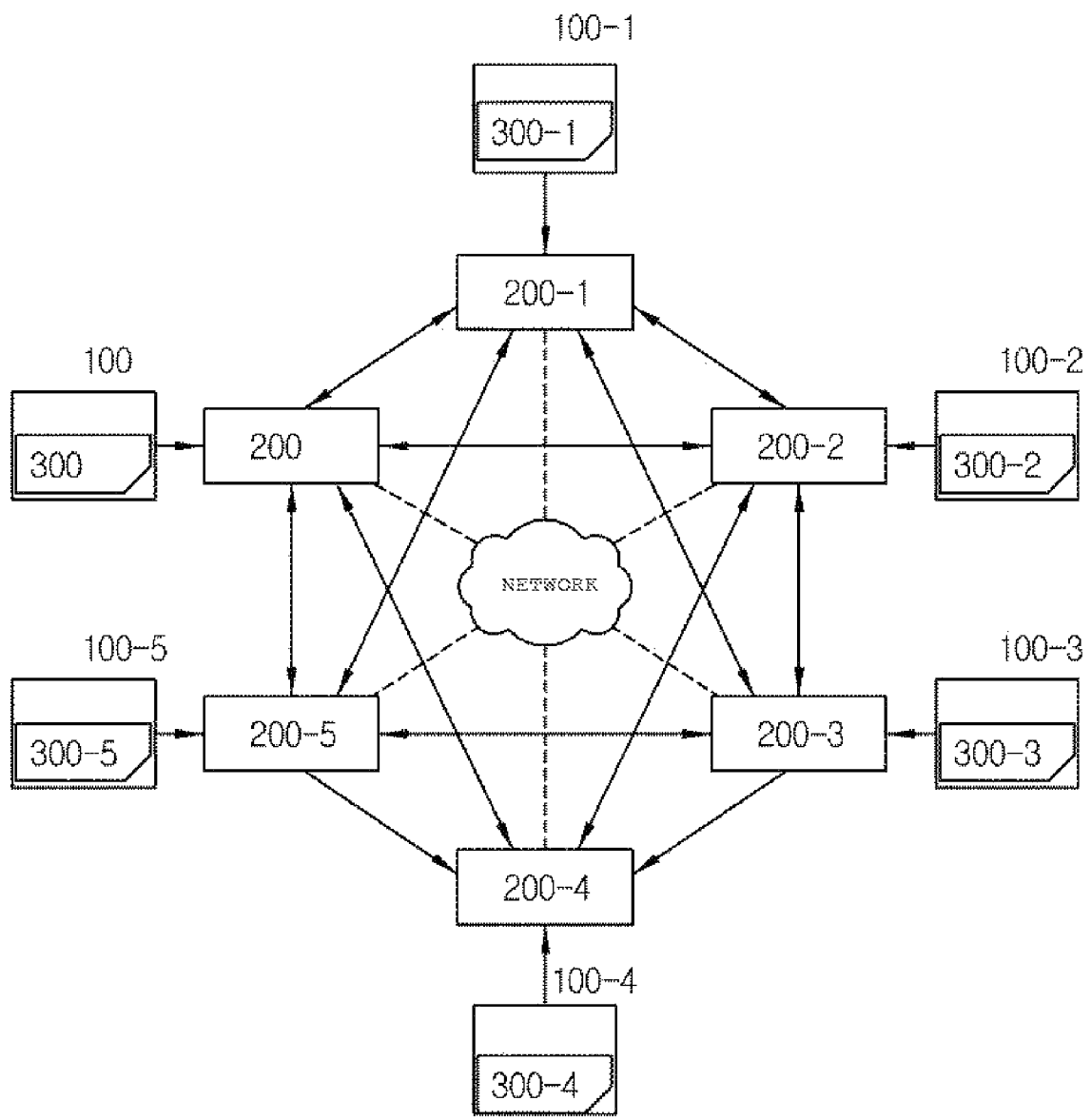

CONTENT WALLET DEVICE AND SELF-SOVEREIGN IDENTITY AND COPYRIGHT AUTHENTICATION SYSTEM USING THE SAME

CROSS REFERENCE TO RELATED APPLICATIONS

This application is a National Stage of International Application No. PCT/KR2020/016341, filed Nov. 19, 2020, claiming priority to Korean Patent Application No. 10-2019-0169407, filed Dec. 18, 2019, the entire disclosures of which are incorporated herein by reference.

TECHNICAL FIELD

The present disclosure relates to a content wallet device and a system using the same, and more particularly, to a content wallet device in which security of content information is enhanced by newly generating a password required for self-sovereign identity authentication, and a system using the same.

BACKGROUND ART

It is common for private business operators who want to operate an online platform to operate their businesses by entrusting an operator who operates a centralized database with data management regarding personal information required for membership registration and platform use history, and the right to use the corresponding information.

In a case where a private online platform operated with the centralized database as such is hacked by a third party, there is a problem that data of other users who use the private online platform in common may be easily leaked.

In addition, when private business operators who want to operate a personal online platform use the private online platform, they should not only pay a high fee for use of the private online platform, but may also quickly cope with a problem occurring in personal data management.

DISCLOSURE

Technical Problem

An object of the present disclosure is to provide to a content wallet device capable of allowing a user to directly transmit a content stored in a storage device to a purchaser who wants to purchase the content without the intervention of a central management server and enhancing security by generating a new password whenever user authentication is required so that hacking or leakage does not easily occur, and a system using the same.

Technical Solution

According to an embodiment of the present disclosure, a content wallet device to which a storage device storing a content is connected may include: a communication unit for communication between the content wallet device and a user terminal device; an encryption unit generating encryption data including a user ID and a password for authentication between the content wallet device and the user terminal device; a switch unit controlling an electrical connection between the storage device and the communication unit; and a reset unit initializing the generated password when the electrical connection between the storage device and the communication unit is released by the switch unit.

In this case, when the storage device and the communication unit are electrically connected to each other by the switch unit, the encryption unit may generate a first random password, when the electrical connection between the storage device and the communication unit is released by the switch unit, the reset unit may initialize the first random password, and when the storage device and the communication unit are electrically connected to each other again by the switch unit, the encryption unit may generate a second random password.

In addition, when the storage device and the communication unit are electrically connected to each other by the switch unit, the communication unit may transmit a signal for blocking a network of the user terminal device to the user terminal device.

Here, when the network of the user terminal device is blocked, the authentication may be performed between the content wallet device and the user terminal device through the encryption data generated by the encryption unit.

Furthermore, the encryption unit may encrypt the content and transmit the encrypted content to the communication unit, when the storage device and the communication unit are electrically connected to each other by the switch unit.

In addition, the encryption unit may insert an identification code unique to a user into the content.

According to another embodiment of the present disclosure, a system may include a content wallet device and a user terminal device, wherein the content wallet device transmits encryption data including a user ID and a password to the user terminal device for authentication between the content wallet device and the user terminal device, and the user terminal device performs the authentication between the content wallet device and the user terminal device when a password input according to a user's manipulation is matched with the transmitted password.

Here, the content wallet device may randomly generate and transmit a password for the authentication whenever the authentication between the content wallet device and the user terminal device is performed.

In addition, the content wallet device may transmit a signal for blocking a network of the user terminal device to the user terminal device when the storage device and the content wallet device are electrically connected to each other, and the user terminal device may block the network when a user's manipulation corresponding to the transmitted signal is input.

Advantageous Effects

As set forth above, according to various embodiment of the present disclosure, when a user sells a content, the user and a purchaser may directly sell and purchase the content, respectively, without transferring authority to a central management system, and by generating a new password whenever the user authenticates ownership of the content, a third party hacking may be prevented to prevent illegal leakage of the content.

DESCRIPTION OF DRAWINGS

FIG. 1 is a block diagram illustrating a configuration of a content wallet device according to an embodiment of the present disclosure.

FIG. 2 is a block diagram illustrating a configuration of a content wallet device according to another embodiment of the present disclosure.

(a) and (b) of FIG. 3 are cross-sectional views for describing the content wallet device illustrated in FIG. 2.

FIG. 4 is a view for describing a state in which a content wallet device is embedded in a user terminal device according to another embodiment of the present disclosure.

FIG. 5 is a view for describing a state in which various storage devices are connected to a content wallet device according to another embodiment of the present disclosure.

FIG. 6 is a diagram for describing a system using a content wallet device according to an embodiment of the present disclosure.

FIG. 7 is a flowchart for describing a flow of the system using a content wallet device illustrated in FIG. 6.

FIG. 8 is a diagram for describing a system using a content wallet device according to another embodiment of the present disclosure.

BEST MODE FOR INVENTION

Hereinafter, the present disclosure will be described in more detail with reference to the accompanying drawings. In addition, in describing the present disclosure, when it is decided that a detailed description for known functions or configurations related to the present disclosure may obscure the gist of the present disclosure, the detailed description therefor will be omitted. Further, terms to be described later are defined in consideration of functions in the present disclosure and may be changed depending on the intention or relationship of users and operators. Therefore, these terms should be defined based on contents throughout the present specification.

A storage device 300 according to the present disclosure may be an independent storage device including a storage function, such as an external hard drive, a universal serial bus (USB), a compact disk (CD), or a memory card capable of storing a content, and it will hereinafter be described that the storage device is a memory card (hereinafter, denoted by 300 which is a reference numeral of the storage device), but the storage device is not limited thereto.

FIG. 1 is a block diagram illustrating a configuration of a content wallet device according to an embodiment of the present disclosure.

Referring to FIG. 1, the content wallet device 100 may be connected to a memory card 300 in which a content is stored, and may transmit the content stored in the memory card 300 to a user terminal device 200.

In this case, the user terminal device 200 may be a mobile terminal device, but may be other electronic devices capable of performing electrical communication, such as a tablet personal computer (PC), a personal digital assistant (PDA), a wearable device, a laptop computer, a desktop PC, and a digital camera.

In addition, the content wallet device 100 may include a communication unit 110, an encryption unit 120, a switch unit 130, a storage unit 140, and a reset unit 150 in order to transmit the content.

The communication unit 110 enables communication between the content wallet device 100 and the user terminal device 200, and communication may be performed through a direct connection in a wired manner or an indirect connection in a wireless manner within a predetermined range.

For example, in a connection between the user terminal device 200 and the content wallet device 100 in the wired manner, a manner of connecting the content wallet device 100 to a charging terminal generally used in the user terminal device 200 may be used. In addition, the user terminal device 200 and the content wallet device 100 may be directly connected to each other using a manner of connecting the content wallet device 100 to a terminal into which an external hard drive, a USB, an earphone, or the like, is inserted.

In the connection in the wireless manner, when the content wallet device 100 and the user terminal device 200 are positioned within a predetermined range, the content wallet device 100 and the user terminal device 200 may be indirectly connected to each other using near field communication (NFC), radio frequency identification (RFID), Bluetooth, infrared communication, and the like.

The content wallet device 100 and the user terminal device 200 are connected to each other by the communication unit 110 as such, such that the content stored in the memory card 300 inserted into the content wallet device 100 may be moved to the user terminal device 200, and a password randomly generated for authentication in the content wallet device 100 may be moved to the user terminal device 200.

Moreover, the communication unit 110 may transmit a signal for blocking a network of the user terminal device 200 to the user terminal device 200, which will be described in detail below.

The encryption unit 120 may generate encryption data including a user identification (ID) and a password (passcode) for authentication between the content wallet device 100 and the user terminal device 200.

Specifically, the encryption unit 120 may generate the encryption data when the memory card 300 and the communication unit 110 are electrically connected to each other.

The user ID included in the encryption data may be a user authentication ID stored in the storage unit 140, and may be, for example, an identity authentication ID by a decentralized identity (DID).

The DID is a self-sovereign identity verification technology based on a decentralized storage system, and the decentralized storage system is a method that does not delegate ownership of information that may identify an identity of an individual to a centralized system such as a specific institution or company and separately stores and manages information required for identity verification by end members of a network.

In other words, the self-sovereign identity verification technology is a manner in which individuals prove their sovereignty over identity verification information.

The encryption unit 120 may generate the DID as the encryption data together with a password by invoking the DID from the storage unit 140.

In addition, the password included in the generated encryption data may be a password generated by mixing numbers, letters, symbols, or the like, with each other or generated by using a number of times of a touch, a pattern, a touch area designation, or the like.

For example, when the number of inputable digits of the generated password is 10, in a case where the user terminal device is a desktop PC, the password may be generated by mixing only numbers from 0 to 9 among numbers, letters, or symbols with each other or be generated by mixing Korean, English, and symbols written together with numbers above the numbers included in a typewriter with each other.

In addition, the password may be generated in the form of a pattern using a straight line or a curved line from the content wallet device to a screen of the desktop PC.

Furthermore, the encryption unit 120 may encrypt the content stored in the memory card 300 before the content is transmitted to the user terminal device 200, and transmit the encrypted content to the communication unit 110. This is that the encryption unit 120 encrypts the content when the memory card 300 and the communication unit 110 are electrically connected to each other by the switch unit 130.

For example, the encryption unit 120 may encrypt the content in an analog manner using a pre-stored mechanism or encrypt the content in a digital manner using a pre-stored logical algorithm.

The encrypted content is encrypted according to a public key encryption manner or a private key encryption manner, and the encryption unit 120 may also generate a decryption key and transfer the generated decryption key to the communication unit 110 so that the encrypted content may be decrypted again.

In addition, the encryption unit 120 may exclude the encryption of the content and insert only an identification code unique to a user into the content so as to identify an original author of the content, in order to simplify a content encryption process.

For example, the identification code unique to the user may be formed through a watermark. The watermark is a technology of inserting a mark known only by the original author of the content, and in a case where a third party who was unauthorized illegally copies or distributes the content, the watermark inserted into the content may be extracted to confirm that the content is the content of the original author and may be used to track a path through which the content is copied.

The switch unit 130 may control an electrical connection between the memory card 300 and the communication unit 110.

For example, the switch unit 130 is a button type whose position may be physically changed, and may include a toggle switch, a push button switch, a sliding button switch, and the like.

The switch unit 130 whose position may be physically changed as such may electrically connect the memory card 300 and the communication unit 110 to each other by moving in a direction in which the memory card 300 is inserted into the content wallet device 100 after the memory card 300 is inserted into the content wallet device 100. Conversely, the switch unit 130 may release the electrical connection between the memory card 300 and the communication unit 110 by moving in an opposite direction to the direction in which the memory card 300 is inserted into the content wallet device 100.

However, this is an embodiment for describing the present disclosure. Therefore, when communication between the content wallet device 100 and the user terminal device 200 is performed, a manner in which the memory card 300 and the communication unit 110 are automatically connected to each other in the content wallet device 100 rather than a manner of connecting the memory card 300 and the communication unit 110 to each other by physically adjusting the position of the switch unit 130 may be implemented.

In addition, when the memory card 300 and the communication unit 110 are electrically connected to each other by the switch unit 130, the communication unit 110 may transmit the signal for blocking the network of the user terminal device 200 to the user terminal device 200.

In a case where the user terminal device 200 is a mobile terminal device, the communication unit 110 may transmit a message asking whether or not to switch a mode of the mobile terminal device to an airplane mode to the mobile terminal device, and it may be selected by a user's manipulation whether or not to switch the mode of the mobile terminal device to the airplane mode.

Furthermore, when the network of the user terminal device 200 is blocked, authentication may be performed between the content wallet device 100 and the user terminal device 200 through the encryption data including the user ID and the password, generated by the encryption unit 120.

Continuing to describe the mobile terminal device as an example, in a case where the switch of the mode of the mobile terminal device to the airplane mode is selected by the user, the network of the mobile terminal device may be blocked, and the encryption data generated by the encryption unit 120 may be transmitted to the mobile terminal device.

In this case, the user inputs the password included in the transmitted encryption data to the mobile terminal device, and in a case where the input password coincides with the password generated by the content wallet device 100, data regarding copyright identification information for the stored content may be additionally recorded in the content wallet device 100.

In addition, authentication of the user for the encrypted content is performed by confirming whether or not the password input to the mobile terminal device by a user's manipulation coincides with the password generated by the content wallet device 100. As a result, self-sovereign identity authentication may be performed.

As described above, in a case where the user terminal device is the desktop PC, the desktop PC may receive the password generated by mixing only the numbers from 0 to 9 among the numbers, the letters, or the symbols with each other or the password generated by mixing Korean, English, and the symbols written together with the numbers above the numbers included in the typewriter with each other, and authentication may be performed by inputting a password corresponding to the password transmitted through the typewriter or other input device.

In addition, in a case of a pattern password, authentication may be performed by drawing a transmitted pattern password with a mouse or a touchable screen of the user terminal device to input the password.

Here, it may be confirmed in the storage unit 140 included in the content wallet device 100 whether or not the password transmitted by the encryption unit 120 and the password input by the user through the user terminal device 200 coincide with each other.

For example, it may be confirmed through a password authentication module or a password authentication program stored in the storage unit 140 whether or not the password transmitted by the encryption unit 120 and the password input by the user through the user terminal device 200 coincide with each other.

The storage unit 140 may include at least one of a read only memory (ROM), a random access memory (RAM), an erasable programmable read only memory (EPROM), an electrically erasable programmable read only memory (EEPROM), and a hard disk, and may be a storage medium including a non-volatile memory capable of storing data.

When the password generated in the content wallet device 100 through the storage unit 140 and the password input to the user terminal device 200 by the user's manipulation coincide each other, the user who is an owner of the user ID may inquire the content stored in the memory card 300 of the content wallet device 100 authenticated through the user terminal device 200.

In addition, in a case where it is necessary to transmit the content to another external terminal device, the inquired content may be selected and transmitted from the content wallet device 100 to the user terminal device 200, and the user terminal device 200 may then transmit the received content to another external terminal device.

Here, in a case where the selected content is transmitted from the content wallet device 100 to the user terminal device 200, the selected content may be encrypted and then transmitted. Meanwhile, the content wallet device 100 may include a processor (not illustrated). In this case, the operation of the encryption unit 120 described above may be performed by the processor (not illustrated). In this case, the encryption unit 120 may be replaced by the processor (not illustrated).

The processor (not illustrated) may read a program stored in the password authentication module stored in the storage unit 140 to calculate whether or not the generated password and the password input to the user terminal device 200 by the user's manipulation coincide with each other.

In addition, the processor (not illustrated) may read a program stored in a content encryption module stored in the storage unit 140 to encrypt the content as described above.

The reset unit 150 may initialize the generated password when the electrical connection between the memory card 300 and the communication unit 110 is released by the switch unit 130.

For example, when the memory card 300 is inserted into the content wallet device 100 and the switch unit 130 is moved in the direction in which the memory card 300 is inserted into the content wallet device 100, the memory card 300 and the communication unit 110 are electrically connected to each other, such that the encryption unit 120 may generate a first random password.

Thereafter, when the switch unit 130 is moved in the opposite direction to the direction in which the memory card 300 is inserted into the content wallet device 100, the first random password may be initialized by the reset unit 150 while the electrical connection between the memory card 300 and the communication unit 110 is released.

In this case, the first random password generated by the encryption unit 120 is stored in the storage unit 140, and the first random password stored in the storage unit 140 may be initialized by the reset unit 150 while the electrical connection between the memory card 300 and the communication unit 100 is released by the switch unit 130.

When the switch unit 130 is moved again in the direction in which the memory card 300 is inserted into the content wallet device 100, the encryption unit 120 may generate a second random password different from the initialized first random password while the memory card 300 and the communication unit 110 are electrically connected to each other again, and the second random password may also be stored in the storage unit 140.

In this way, whenever the content wallet device 100 and the user terminal device 200 are connected to each other, the encryption unit 120 may randomly generate a new password, and the previously randomly generated password may be initialized by the reset unit 150 to prevent a hacking risk by a third party.

FIG. 2 is a block diagram illustrating a configuration of a content wallet device according to another embodiment of the present disclosure, and (a) and (b) of FIG. 3 are cross-sectional views for describing the content wallet device illustrated in FIG. 2.

Here, the communication unit 110, the encryption unit 120, the switch unit 130, the storage unit 140, and the reset unit 150 have already been described, and a detailed description thereof will thus be omitted.

Referring to FIG. 2, the content wallet device 100 may further include an input unit 160.

The input unit 160 is for receiving a user's manipulation, and the password generated by the content wallet device 100 may be input and generated to the input unit 160 by the user's manipulation.

In other words, as an embodiment, the randomly generated password may be randomly generated through the encryption unit 120 while the memory card 300 and the communication unit 110 are electrically connected to each other by the switch unit 130 illustrated in FIG. 1, and as another embodiment, the password may be input and randomly generated by the user's manipulation through the input unit 160 illustrated in FIG. 2.

Since the password is generated by the user's manipulation, it will be natural that the password before being initialized by the reset unit 150 and the password after being initialized by the reset unit 150 may be the same as each other.

In this case, the encryption unit 120 illustrated in FIG. 2 may encrypt the content stored in the memory card 300 and generate a decryption key for decrypting the encrypted content.

In addition, the encryption unit 120 may generate an identification code unique to the user so that the original author of the content may be identified.

Describing an operation of the content wallet device 100 with reference to FIGS. 3A and 3B, the memory card 300 may be inserted into the content wallet device 100, and the inserted memory card 300 may be connected to the encryption unit 120.

In this case, when the switch unit 130 is moved in the direction in which the memory card 300 is inserted into the content wallet device 100, the encryption unit 120 may generate a user ID by invoking the user ID stored in the storage unit 140 while the memory card 300 and the communication unit 110 are electrically connected to each other.

In addition, a password arbitrarily input by the user through the input unit 160 may be randomly generated, and at the same time, be stored in the storage unit 140.

The password generated through the input unit 160 and the user ID generated through the encryption unit 120 may be transferred to the communication unit 110.

The randomly generated password transferred to the communication unit 110 may be transmitted to the user terminal device 200, and when the user inputs the randomly generated password through the user terminal device 200, the content wallet device 100 receives the password input by the user through the communication unit 110, and the storage unit 140 stores the received password.

In this way, the storage unit 140 may confirm whether or not the password randomly generated in the content wallet device 100 and the password input to the user terminal device 200 coincide with each other.

In a case where these passwords coincide with each other, the user may inquire the content stored in the memory card 300 through the user terminal device 200. In addition, when the content is to be transmitted to an external terminal device, the encryption unit 120 may encrypt the content stored in the memory card 300 and transfer the encrypted content to the communication unit 110, and the communication unit 110 may transmit the encrypted content to the external terminal device through the user terminal device 200.

When the switch unit 130 is moved to the opposite direction to the direction in which the memory card 300 is inserted into the content wallet device 100, the password stored in the storage unit 140 may be initialized by the reset unit 150.

However, the content wallet device 100 illustrated in FIGS. 3A and 3B is an example for implementing the present disclosure, and thus, positions of components included in the content wallet device 100 may be changed according to user's use and convenience.

FIG. 4 is a view for describing a state in which a content wallet device is embedded in a user terminal device according to another embodiment of the present disclosure.

Referring to FIG. 4, the content wallet device 100 may be implemented in a form in which it is embedded in the user terminal device 200.

In this case, communication between the content wallet device 100 and the user terminal device 200 is performed in a process in which the content wallet device 100 is inserted into the user terminal device 200, and when the content wallet device 100 is completely inserted into the user terminal device 200, the content wallet device 100 and the user terminal device 200 may be electrically connected to each other.

The content wallet device 100 and the user terminal device 200 are electrically connected to each other, and at the same time, the content wallet device 100 transmits a message for blocking an external communication network to the user terminal device 200.

When the user inputs a selection to block the external communication network to the user terminal device 200, the content wallet device 100 may randomly generate a password, and invoke a user ID stored in the content wallet device 100 and transmit the user ID to the user terminal device 200 together with the generated password.

In this case, the password transmitted to the user terminal device 200 is input by the user, and the content wallet device 100 matches the input password and the password randomly generated by the content wallet device 100 with each other to confirm whether or not the input password and the password randomly generated by the content wallet device 100 coincide with each other, encrypts the content stored in the memory card 300, and transmits the encrypted content to the user terminal device 200.

When the transmission of the encrypted content to the user terminal device 200 is completed, the inserted content wallet device 100 may be separated from the user terminal device 200 to the outside.

In this case, the randomly generated password may be initialized while the content wallet device 100 is separated from the user terminal device 200.

As another example in which the content wallet device 100 is embedded in the user terminal device 200 and is implemented, a switch unit (not illustrated) whose position may be changed may be included on one surface of the content wallet device 100 exposed to the outside without being inserted when the content wallet device 100 is inserted into the user terminal device 200.

Such a switch unit may be a toggle switch, a push button switch, a sliding button switch, and the like, and the electrical connection between the content wallet device 100 and the user terminal device 200 may be controlled by moving the switch unit.

FIG. 5 is a view for describing a state in which various storage devices are connected to a content wallet device according to another embodiment of the present disclosure.

Referring to FIG. 5, the content wallet device 100 may include a plurality of input/output ports, and various storage devices may be connected to the content wallet device 100 through the input/output ports.

In this case, the wallet device 100 including the plurality of input/output ports may be a docking station device such as USB or Thunderbolt.

FIG. 6 is a diagram for describing a system using a content wallet device according to an embodiment of the present disclosure.

Referring to FIG. 6, the system 10 using a content wallet device may include the content wallet device 100 and the user terminal device 200.

The content wallet device 100 may transmit encryption data including a user ID and a randomly generated password to the user terminal device 200 for authentication between the content wallet device 100 and the user terminal device 200.

The user terminal device 200 may perform the authentication between the content wallet device 100 and the user terminal device 200 when a password input according to a user's manipulation is matched with the transmitted password.

For example, the content wallet device 100 may transmit the randomly generated password to the user terminal device 200, the user inputs the transmitted password through the user terminal device 200, and the content wallet device 100 receiving the input password may match the input password and the randomly generated password with each other to confirm whether or not the input password and the randomly generated password coincide with each other.

Here, the randomly generated password may be newly generated whenever the content wallet device 100 and the user terminal device 200 perform the authentication, and the content wallet device 100 may confirm whether or not the newly generated password and the input password coincide with each other whenever the authentication is performed.

When the matched passwords coincide with each other, the content wallet device 100 may transfer the content and the user ID to the user terminal device 200, and may directly transmit the encrypted content and a user ID together with a decryption key to a user terminal device 200-1 of another user who wants to purchase the content.

In this case, the user terminal device 200 may perform identity authentication by decentralized identities (DIDs) by transmitting the user ID transmitted from the content wallet device 100 to the user terminal device 200-1 of another user.

For example, when the user terminal device 200 that is to supply the content transmits a deactivated user ID (DID) and the encrypted content transmitted from the content wallet device 100 to the user terminal device 200-1 of another user, the user terminal device 200-1 of another user may perform user identity authentication for a corresponding individual demand to a supplier by transmitting a self-sovereign identity (SSI). To the contrary, another user inputs a password randomly generated through his/her content wallet device 100-1 to the user terminal device 200-1, and may transmit a content owned by him/her to the user terminal device 200-1 and directly transmit the content to another user terminal device 200 when a password transferred from the content wallet device 100-1 and the password input by the user of the user terminal device 200-1 coincide with each other.

A third party hacking and illegal leakage of contents may be prevented by proving that different users owning the contents are legitimate users through the passwords randomly generated through the content wallet devices 100 and 100-1 and the user terminal devices 200 and 200-1 and then transmitting the user IDs and the contents.

Referring to FIGS. 1 and 6, the system 10 including the content wallet device 100 may transmit a signal for blocking a network of the user terminal device 200 to the user terminal device 200 when the memory card 300 and the content wallet device 100 are electrically connected to each other, and the user terminal device 200 may block the network when a user's manipulation corresponding to the transmitted signal is input.

In this case, the blocked network may be an external communication network of the user terminal device 200, and may include, for example, a local area network (LAN), a metropolitan area network (MAN), and a wide area network (WAN), and the like. Specifically, for example, in a case where the user terminal device 200 is a mobile terminal device, the communication unit 110 may transmit a message asking whether or not to switch a mode of the mobile terminal device to an airplane mode to the mobile terminal device, and it may be selected by a user's manipulation whether or not to switch the mode of the mobile terminal device to the airplane mode.

In this case, when the user selects the switch of the mode of the mobile terminal device to the airplane mode, a network, which is an external communication network of the mobile terminal device, may be blocked, and only communication between the content wallet device 100 and the user terminal device 200 may be performed through a direct connection in a wired manner or an indirect connection in a wireless manner within a predetermined range.

FIG. 7 is a flowchart for describing a flow of the system using a content wallet device illustrated in FIG. 6.

Referring to FIG. 7, the system 10 using a content wallet device may sequentially perform a step (S100) of inserting the memory card into the content wallet device, a step (S200) of determining whether or not the inserted memory card and the content wallet device have been connected to each other, a step (S300) of transmitting a signal for blocking a network from the content wallet device to the user terminal device, a step (S400) of determining whether or not the network of the user terminal device has been blocked, a step (S500) of transmitting encryption data from the content wallet device to the user terminal device, a step (S600) of confirming whether or not randomly generated passwords between the content wallet device and the user terminal device coincide with each other, and a step (S700) of encrypting a content by the content wallet device and transmitting the encrypted content from the content wallet device to the user terminal device.

The step (S100) of inserting the memory card into the content wallet device is a step of inserting the memory card in which the content is stored into the content wallet device. Then, the step (S200) of determining whether or not the inserted memory card and the content wallet device have been connected to each other may be performed.

In this case, the step (S200) of determining whether or not the inserted memory card and the content wallet device have been connected to each other may be a step of confirming whether or not the memory card and the content wallet device have been electrically connected to each other due to a physical change.

In a case where the memory card and the content wallet device have not been electrically connected to each other, the system using a content wallet device does not perform a procedure of transmitting the content to the user terminal device.

On the other hand, when the memory card and the content wallet device have been electrically connected to each other, the step (S300) of transmitting the signal for blocking the network from the content wallet device to the user terminal device may be performed.

The step (S300) of transmitting a signal for blocking a network from the content wallet device to the user terminal device may be a step of transmitting the signal for blocking the network, which is an external communication network used by the user terminal device for communication with other electronic devices.

When the signal for blocking the network is normally transmitted to the user terminal device, it may be selected by a user's manipulation whether or not to block the network.

The step (S400) of determining whether or not the network of the user terminal device has been blocked may be a step of determining whether or not the network of the user terminal device has been normally blocked when the blocking of the network is selected by the user's manipulation.

When the network of the user terminal device has not been normally blocked, the system using a content wallet device may return to the step (S200) of determining whether or not the inserted memory card and the content wallet device have been connected to each other to determine whether or not the inserted memory card and the content wallet device have been connected to each other.

On the other hand, when the network of the user terminal device has been normally blocked, the step (S500) of transmitting encryption data from the content wallet device to the user terminal device may be performed.

In this case, the encryption data may be data including a user ID and a randomly generated password.

The step (S500) of transmitting encryption data from the content wallet device to the user terminal device may be a step of randomly generating a password and transmitting the randomly generated password to the user terminal device by the encryption unit included in the content wallet device when the memory card and the content wallet device are normally connected to each other.

In this case, the user ID as well as the randomly generated password may be transmitted to the user terminal device.

When the randomly generated password is transmitted to the user terminal device as described above, the step (S600) of confirming whether or not the randomly generated passwords between the content wallet device and the user terminal device coincide with each other may be performed.

In the step (S600) of confirming whether or not the randomly generated passwords between the content wallet device and the user terminal device coincide with each other, when the randomly generated password transmitted to the user terminal device is input to the user terminal device by a user's manipulation, the input password is transmitted to the content wallet device, and the transmitted password is matched with the randomly generated password in the content wallet device.

When the matched passwords do not coincide with each other, the step (S200) of determining whether or not the inserted memory card and the content wallet device have been connected to each other may be performed, and the previously randomly generated password may be initialized and another password may be randomly generated while an electrical connection between the memory card and the content wallet device is newly made.

On the other hand, when the matched passwords coincide with each other, the step (S700) of encrypting the content by the content wallet device and transmitting the encrypted content from the content wallet device to the user terminal device may be performed.

The step (S700) of encrypting the content by the content wallet device and transmitting the encrypted content from the content wallet device to the user terminal device may be a step of transmitting the encrypted content together with a decryption key capable of decrypting the encrypted content so that another user to which an original author of the content is to transmit the content and a user who normally purchases the content may use the content, simultaneously with encrypting the content stored in the memory card.

In this case, the encrypted content may be transmitted in a state in which an identification code unique to the user is inserted into the encrypted content, in order to identify the original author of the content.

FIG. 8 is a diagram for describing a system using a content wallet device according to another embodiment of the present disclosure.

Referring to FIG. 8, the system 10 using a content wallet device may directly transmit contents between users who own user terminal devices 200, 200-1, 200-2, 200-3, 200-4, and 200-5 for free or for a fee, but the user may easily receive desired contents by using content wallet devices 100, 100-1, 100-2, 100-3, 100-4, and 100-5 for a plurality of user terminal devices 200, 200-1, 200-2, 200-3, 200-4, and 200-5.

In this case, when any one of the plurality of user terminal devices 200, 200-1, 200-2, 200-3, 200-4, and 200-5 performs user authentication through the content wallet device 100 and then transmits an encrypted content to a network, the network may provide a preview or related information of the encrypted content.

Then, in a case where a plurality of users view the preview or the related information of the encrypted content through their own user terminal devices 200-1, 200-2, 200-3, 200-4, and 200-5 and want to purchase the encrypted content, the plurality of users make payment for the encrypted content, and when the payment is completely made, an original author who owns the encrypted content may transmit the encrypted content and a decryption key together to the other user terminal devices 200-1, 200-2, 200-3, 200-4, and 200-5.

Here, purchase histories, transmission histories, and the like, between the user terminal devices 200, 200-1, 200-2, 200-3, 200-4, and 200-5 that use the content wallet devices 100, 100-1, 100-2, 100-3, 100-4, and 100-5 may be performed and stored by a distributed ledger.

The distributed ledger may be based on a generally used blockchain, and all the exchange histories of the content using the content wallet device 100 according to the present disclosure may be stored by using the distributed ledger.

In addition, the distributed edger may store information on a user who creates the purchase history, the transmission history, and the like, through a user ID transmitted from each of the content wallet devices 100, 100-1, 100-2, 100-3, 100-4, and 100-5.

In this case, as described above, the used user ID is a user authentication ID owned by the user of each of the content wallet devices 100, 100-1, 100-2, 100-3, 100-4, and 100-5, that is, a decentralized ID (DID).

Accordingly, each of the users may view all histories stored by the decentralized ledger, and it may be easily known which users have made purchases, transmissions, and the like, such that transparent transactions are possible.

In addition, the user may directly manage a user authentication method in which the identity information was managed by a central server by using the DID.

In other words, for example, when the content stored in the memory card is a moving image, a decentralized ID (DID) required for identity authentication of the user may be transmitted from the user terminal device 200 that is to supply the moving image to the user terminal devices 200-1, 200-2, 200-3, 200-4, and 200-5 that are to purchase the moving image.

Thereafter, when the user terminal devices 200-1, 200-2, 200-3, 200-4, and 200-5 that are to purchase the moving image transmit identity authentication values (SSIs), such that identity authentication of users is established, the moving image may be encrypted in which it is not completely disclosed, and be transmitted to the user terminal devices 200-1, 200-2, 200-3, 200-4, and 200-5 that are to purchase the moving image together with a decryption key.

In this process, all of supply records of the user terminal device 200 that has supplied the moving image, purchase histories of the user terminal devices 200-1, 200-2, 200-3, 200-4, and 200-5 that are to purchase the moving image, and the like, may be stored in distributed ledger data by each of the user terminal devices 200-1, 200-2, 200-3, 200-4, and 200-5.

Although embodiments of the present disclosure have been illustrated and described hereinabove, the present disclosure is not limited to the above-mentioned specific embodiments, but may be variously modified by those skilled in the art to which the present disclosure pertains without departing from the scope and spirit of the present disclosure as disclosed in the accompanying claims. These modifications should also be understood to fall within the scope of the present disclosure.

The invention claimed is:

1. A content wallet device to which a storage device storing a content is connected, comprising:
    a communication unit for communication between the content wallet device and a user terminal device;
    an encryption unit generating encryption data including a user ID and a password for authentication between the content wallet device and the user terminal device;
    a switch unit controlling an electrical connection between the storage device and the communication unit; and
    a reset unit initializing the generated password when the electrical connection between the storage device and the communication unit is released by the switch unit,
    wherein when the storage device and the communication unit are electrically connected to each other by the switch unit, the communication unit transmits a signal for blocking a network of the user terminal device to the user terminal device.

2. The content wallet device of claim 1, wherein when the storage device and the communication unit are electrically connected to each other by the switch unit, the encryption unit generates a first random password,
    when the electrical connection between the storage device and the communication unit is released by the switch unit, the reset unit initializes the first random password, and
    when the storage device and the communication unit are electrically connected to each other again by the switch unit, the encryption unit generates a second random password.

3. The content wallet device of claim 2, wherein when the network of the user terminal device is blocked, the authentication is performed between the content wallet device and the user terminal device through the encryption data generated by the encryption unit.

4. The content wallet device of claim 1, wherein the encryption unit encrypts the content and transmits the encrypted content to the communication unit, when the storage device and the communication unit are electrically connected to each other by the switch unit.

5. The content wallet device of claim 1, wherein
the encryption unit inserts an identification code unique to a user into the content.

6. A system comprising a content wallet device and a user terminal device to which a storage device storing content is connected,
wherein the content wallet device transmits encryption data including a user ID and a password to the user terminal device for authentication between the content wallet device and the user terminal device, and
the user terminal device performs the authentication between the content wallet device and the user terminal device when a password input according to a user's manipulation is matched with the transmitted password,
wherein the content wallet device transmits a signal for blocking a network of the user terminal device to the user terminal device when the storage device and the content wallet device are electrically connected to each other, and
the user terminal device blocks the network when a user's manipulation corresponding to the transmitted signal is input.

7. The system of claim 6, wherein the content wallet device randomly generates and transmits a password for the authentication whenever the authentication between the content wallet device and the user terminal device is performed.

\* \* \* \* \*